United States Patent [19]

Kommoss et al.

[11] Patent Number: 4,471,398
[45] Date of Patent: Sep. 11, 1984

[54] MAGNETIC-TAPE CASSETTE APPARATUS HAVING AT LEAST TWO PUSH-BUTTONS WITH A CONTROLLED OVERTRAVEL

[75] Inventors: Klaus Kommoss, Wetzler-Naunheim; Valentin Schütte, Wetzlar, both of Fed. Rep. of Germany

[73] Assignee: U.S. Philips Corporation, New York, N.Y.

[21] Appl. No.: 319,836

[22] Filed: Nov. 9, 1981

[30] Foreign Application Priority Data

Nov. 13, 1980 [DE] Fed. Rep. of Germany ....... 3042745

[51] Int. Cl.³ .................... G11B 5/008; G11B 15/00; G11B 17/00
[52] U.S. Cl. .................... 360/137; 360/69; 360/90; 360/96.4
[58] Field of Search .............. 360/137, 105, 96.5, 360/96.6, 90, 96.4; 242/197, 198, 199, 200, 187

[56] References Cited

U.S. PATENT DOCUMENTS

| | | | |
|---|---|---|---|
| 4,031,556 | 6/1977 | Ban | 360/96.4 |
| 4,172,266 | 10/1979 | Onishi | 242/187 |
| 4,223,362 | 9/1980 | Kishi | 360/69 |
| 4,287,542 | 9/1981 | Okuda | 360/90 |
| 4,319,295 | 3/1982 | Motoyama | 360/137 |

Primary Examiner—Robert Martin Kilgore
Attorney, Agent, or Firm—David R. Treacy

[57] ABSTRACT

A magnetic tape-cassette apparatus comprising at least two push-buttons which have individual functions in the apparatus, when individually pushed in to produce a normal travel of their push-button rods, the individual push-button rods being releasably latched in the position in which the individual function is performed. The two push-button rods, when pushed in simultaneously, are depressible beyond the normal travel over a common overtravel path as a result of pivoting of a catch to perform a further function. Pivoting of the catch is controlled by engagement of at least one pin with portions of at least one guide contour.

21 Claims, 9 Drawing Figures

MAGNETIC-TAPE CASSETTE APPARATUS HAVING AT LEAST TWO PUSH-BUTTONS WITH A CONTROLLED OVERTRAVEL

BACKGROUND OF THE INVENTION

The invention relates to a magnetic tape cassette apparatus which comprises at least two push-buttons which, when their push-button rods are pushed through a travel for individual functions of associated apparatus parts, perform different individual functions and can be latched; and a cassette holder for receiving a cassette, which cassette can be ejected by simultaneous depression of the two push-buttons, for which purpose a catch, which in the case of the individual functions latches the instantaneously depressed push-button, is pivoted in order to perform a third function upon simultaneous depression.

Magnetic-tape cassette equipment of this type is known. Depression of each push-button corresponds to a specific apparatus function, namely fast-forward or fast-reverse operation. The push-button rods cooperate with a catch which, during an individual function, latches each button in the depressed or operational position for fast-forward or fast-reverse operations respectively. However, the catch does not constitute a stop for the push-buttons, so that during depression for the indivudal functions a certain undefined overtravel is possible. Because of the undefined overtravel the third function in the case of simultaneous depression of the two buttons can only be performed within the range of the normal travel, that is only at the location of the drive mechanism of the apparatus. When the dimensions of the apparatus are reduced the space required for the mechanical construction associated with the third function is no longer available within the range of normal travel. This space restriction is a particular problem if a cassette apparatus is to be combined with a car radio.

SUMMARY OF THE INVENTION

It is an object of the invention to construct the push-button mechanism of a magnetic-tape cassette apparatus having two push buttons which perform a particular function upon simultaneous depression in such a way that it is as small as possible near the front of the apparatus and that the function mechanism is transferred as far as possible towards the rear.

According to the invention this object is achieved in that guide contours, for engaging at least one follower pin, are provided for function transmission between the push-button rods and an apparatus part during the displacement of the push-button rods a catch is pivoted as a result of the cooperation of the follower pin and at least one of the guide contours, upon depression of a push-button in order to perform an individual function the catch limits the travel of the relevant push-button rod and upon the simultaneous actuation of the two push-button rods the catch is pivoted by the guide contours in such a way that the push-button rods can move through a common overtravel path.

This construction makes it possible to transfer the catch to a location closer to the rear of the apparatus, so that the width of the push-button mechanism at the location of the drive mechanism can be limited to the width of the buttons. At a rearward location the catch can then control several functions in a generally larger space. Such functions may be the actuation of the head mounting plate with the pressure rollers, the disengagement of the cassette from the drive system, and the release of the ejection bracket. During an individual function, that is during fast-winding modes, the catch limits the travel of the buttons, thereby providing a well-defined common overtravel path for the two buttons.

A substantial additional advantage is that inadvertent ejection is precluded. In the known apparatus inadvertent ejection is possible because inadvertently two buttons may be depressed instead of only one button. Since the ejection function is then already started, ejection is thus possible in the event of depression within the range of normal travel. This inadvertent ejection is precluded by the provision of the overtravel path. The user must deliberately depress both buttons beyond the range of normal travel.

The push-button mechanism of the apparatus may be constructed in different manners. One embodiment of the invention is characterized in that the catch scans the guide contours by means of follower pins upon actuation of the push-button rods,
the guide contours have receding portions, which in the case of individual actuation of the push-button rods are blocked by the portions of the undepressed rod disposed in line with the receding portions on both sides,
upon simultaneous actuation of the push-button rods one of the follower pins runs into the opened receding portions, so that the catch may be pivoted by a loading spring to provide a longer common overtravel path for the two push-button rods.

In this embodiment the guide contours are formed in the push-button rods and the follower pin is arranged on the catch. The guide contours are formed as cut-outs because the push-buttons rods are generally manufactured from a metal.

A different embodiment of the invention is characterized in that the catch is formed with coincident identical guide contours, which are pivoted by follower pins arranged on the push-button rods. The catch with its contours may then be formed as an injection-moulded plastics parts.

Embodiments of the invention will now be described in more detail, by way of example, with reference to the drawing.

DESCRIPTION OF THE PREFERRED EMBODIMENTS

Figure 1:
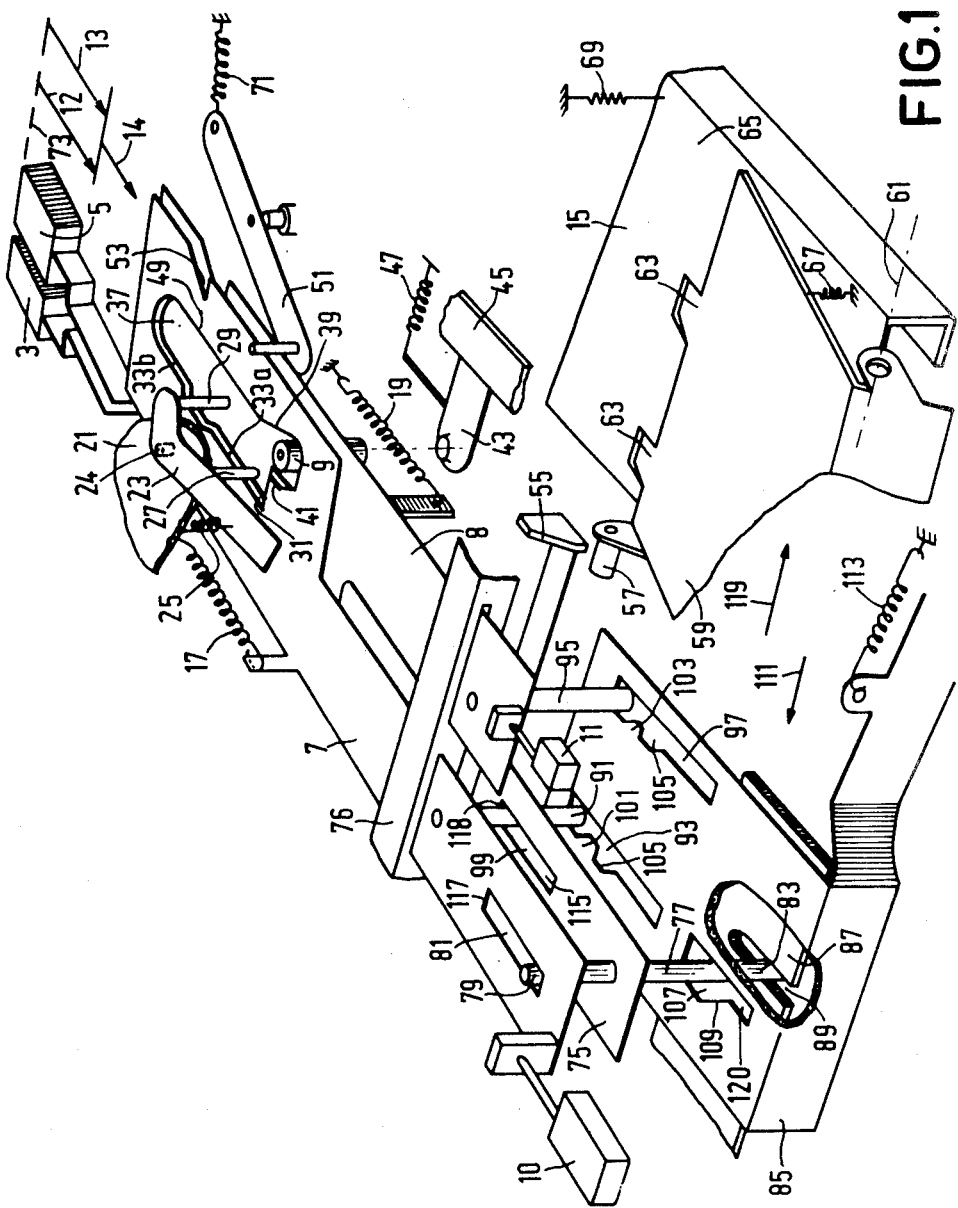
FIG. 1 is a diagrammatic perspective view of an apparatus with an interlocking mechanism for two push-buttons in accordance with the invention.

FIG. 1 illustrates the operation of two separately but also simultaneously depressible push-buttons 3 and 5. The push-buttons 3 and 5 are mounted on push-button rods 7 and 8. When the push-button 3 or 5 is depressed separately the individual functions are performed, as well as a common function which is to lift the head slide with the magnetic head and capstan pressure rollers off the tape and the capstans. This lifting is effected by means of an actuating roller guided by a lifting contour, to be described in more detail hereinafter, and is effected upon depression of each push-button. Electrical switches 10 and 11, which switch the apparatus electrically to fast forward or fast reverse operation, are associated with the individual push-button rods 7 and 8.

When the push-buttons 3 and 5 are individually depressed in order to obtain the individual functions, the push-button rods 7 and 8 are pushed inwards over a travel 12 and 13 to a position in which a respective apparatus function is performed.

In the case of separate depression these travels are clearly defined. If the two push-button rods 7 and 8 are pushed simultaneously, the individual travels 12 and 13 may be extended by a common overtravel path 14. During the overtravel 14 a third function can be performed, which in the present example is of a mechanical nature: to move a cassette holder 15 into a ejection position. However, it is evident that it is also possible to perform further, electrical functions. In addition to these functions, it must be ensured that after release at the end of the overtravel path the two push-button rods 7 and 8 return to their initial positions and are not latched in the normal-travel position at the end of the normal travel.

Figure 2:
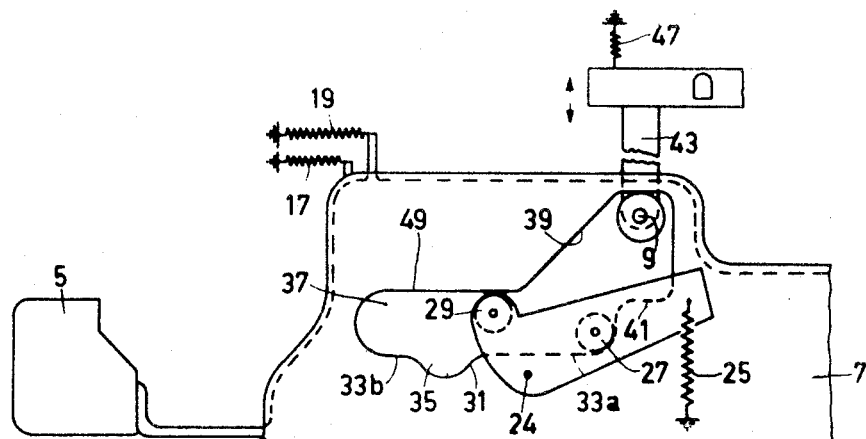
FIGS. 2 to 4 are diagrammatic views of the interlocking mechanism of the two push-buttons in the three functional positions: the rest or initial position, the travel for the individual functions and overtravel for the common function.
Figure 3:
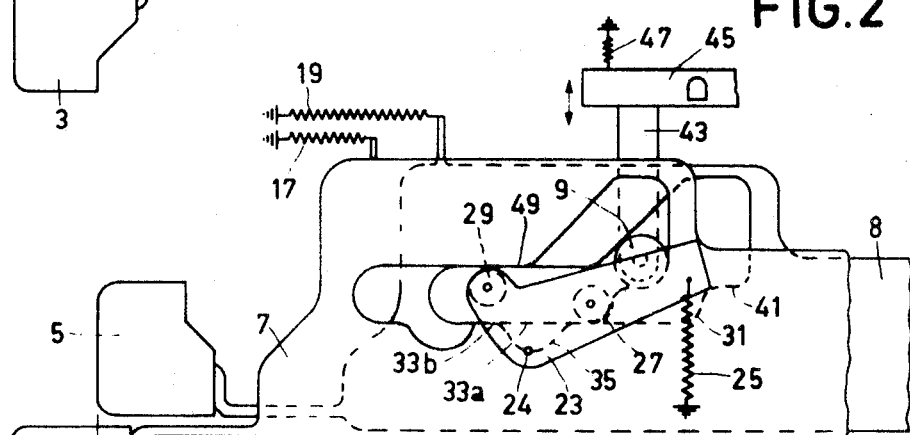

Hereinafter, the operation of the push-button rod mechanism will be described in more detail. The push-button rods 7 and 8 are urged in the direction of the initial positions by means of tension springs 17 and 19. A catch 23 is journalled on a fixed chassis part 21, shown schematically, so as to be pivotable about a spindle 24. The catch 23 is urged in a clockwise direction by means of a tension spring 25 having one end fixed to the chassis part 21. On the catch two follower pins 27 and 29 are arranged. These follower pins 27 and 29 follow a pair of guide contours 31 along corresponding portions of the perimeter of openings 37 in the push-button rods. The guide contours for both push-button rods 7 and 8 are identical and are in register with one another when the push-button rods are not shifted relative to each other. Each guide contour 31 comprises two portions 33a and 33b extending in the actuating direction, between which a receding portion 35 is located. In the initial position represented in FIGS. 1 and 2 the follower pin 27 is located on the portions 33a of the guide contours 31. The follower pin 29 is disposed at but not in contact with the edge of the receding portion 35.

In addition to the guide contour along one side of the perimeter of each opening 37 there is also provided a lifting contour 39 along the opposite side, which is also identical for both push-button rods if the push-button rods are not shifted relative to each other. An acutating roller 9 is disposed adjacent the lifting contour 39 and opposite a stop edge 41 which is identical for both push-button rods, when they are in the initial or rest position.

If one of the push-button rods, for example the push-button rod 8, is pushed in by the push-button 5, the actuating roller 9 is moved towards the stop edge 41 by the lifting contour 39 of the depressed push-button rod. The actuating roller 9 is connected to an arm 43 which then moves the head slide 45 against the action of a tension spring 47. When the actuating roller 9 contacts the stop edge 41 the end of the travel 13 is reached because the roller 9 is captured between the contour 39 of the depressed rod and the edge 41 of the other rod which is in the initial position. The follower pin 27 is still disposed on the portion 33a of the guide contour 31. At the same time that the push-button rod 8 is pushed in the switch 11 for fast reverse operation is actuated. When the button 5 is released the push-button rod 8 returns to its initial position.

Figure 4:
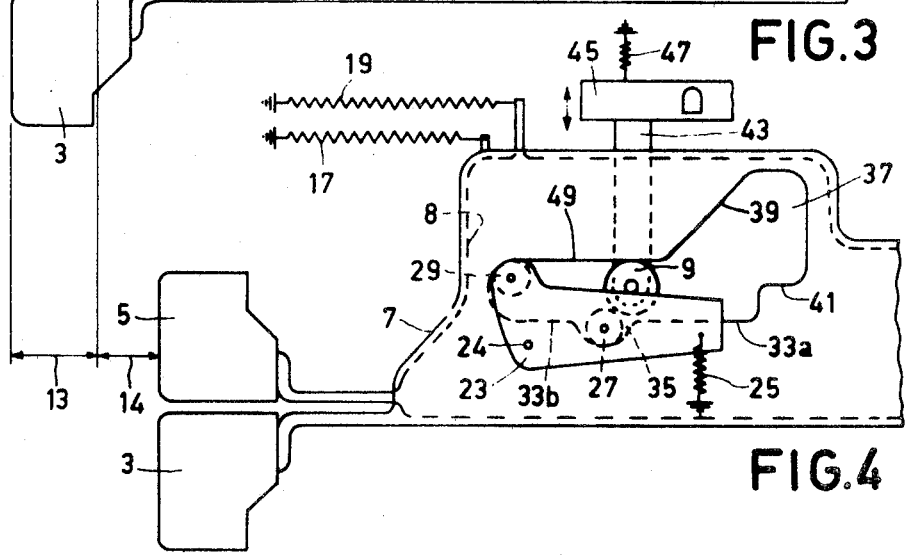

When the push-button rods 7 and 8 are actuated simultaneously they first pass through their common paths of travel 12 and 13. The actuating roller 9 again follows the lifting contour 39. However, since both push-button rods 7 and 8 have now been actuated, the two stop edges 41 are also moved in the actuating direction, as shown in FIG. 4. As a result, these stop edges 41 no longer limit the movement of the actuating roller 9, which can now move past the stop edges 41, out of engagement by the contour 39 so as to be positioned by an extension contour 49 parallel to the direction of rod movement. The follower pin 27 moves into the receding portion 35 and the follower pin 29 is moved upward and to the right (as viewed in FIG. 4) as the catch 23 can now be pivoted clockwise by the spring 25, thereby enabling a further depression of the rods down to the end of the overtravel path 14. At the end of this overtravel path a latching lever 51 engages notches 53 in the push-button rods 7 and 8.

As shown in FIG. 1, the push-button rod 8 is provided with a ramp surface 55. When the two push-button rods 7 and 8 are pushed into the overtravel range the ramp surface contacts a slide pin 57 on a pivotal lever 59 of the cassette holder 15. This pivotal lever, which is pivotable about an axis 61, has tabs 63 which press against the upper surface 65 of the cassette holder 15. In the rest position the tabs 63 on the pivotal lever 39, which is urged in a clockwise direction by a spring 67, hold the cassette holder 15 downwards. However, if the slide pin 57 runs onto the ramp surface 55 upon depression into the overtravel range 14, the tabs 63 are lifted. The cassette holder 15 follows this upward movement under the influence of a biassing spring 69. In the lifted position of the cassette holder 15 a cassette may be exchanged. Upon release of the latching lever 51, which is biassed by a spring 71, the push-button rods 7 and 8 return to their initial positions at the line 73. To ensure that the push-button rods 7 and 8 can only move in the direction of depression, they pass through a guide 76.

An intermediate slide 75 ensures a simultaneously return to the line 73. The intermediate slide 75 comprises a guide pin 77, which projects upwards and downwards. The upper part 79 of the guide pin extends through a slot 81 of the push-button rod 7. The lower part 83 of the guide pin 77 extends through a latching slide 85 and then through a guide slot 89 in a guide member 87 which is rigidly connected to the chassis. A guide pin 91, which also serves as a latching projection, is arranged on the push-button rod 7, the guide pin extending into a slot 93 of the latching slide 85. A guide pin 95 on the push-button rod 8 extends into a slot 97, corresponding to the slot 93, in the latching slide 85. Between the slot 93 and the push-button rod 7 the guide pin 91 also passes through a slot 99 in the intermediate slide 75.

The slots 93 and 97 have respective latching cams 101, 103 formed on longitudinal edges of the slots. Latching recesses 105, which are disposed behind the latching cams in the direction of the actuation, serve to latch the individual push-button rods at the end of the normal travel path 12 or 13. The guide pin 77 also extends through a guide opening 107 in the latching slide 85 between the intermediate slide 75 and the guide member 87. This guide opening has a release contour 109, which cooperates with the lower part 83 of the guide pin 77.

If one of the push-button rods 7 or 8 is separately pushed inwards over the path length 12 or 13, the respective guide pin 91 or 95 is moved past the latching cam 101 or 103, thereby moving the latching slide first in the direction of arrow 111 against the action of a biasing spring 113, and then permitting the spring 113 to move the slide 85 in the direction of arrow 119 to latch the guide pin in the latching recess 105. By again moving the latching slide 85 in the direction of the arrow 111 the latched guide pin is released and the push-button rod returns to its initial position.

If the two push-buttons 3 and 5 are depressed simultaneously, the guide pin 91 moves from the outer slot end 118 to the inner slot end 115 of the slot 99 in the intermediate slide 75. This corresponds to the pathlength 12 or 13. Within the range of these paths the intermediate slide 75 is not moved. When both push-button rods 7 and 8 are pushed further inwards the guide pin 91 engages the inner end 115 of slot 99, and causes a movement of the intermediate slide over the overtravel path to a rearward or overtravel position (not shown). Via the release contour 109 the guide pin 77 moves the latching slide 85 sideways in the direction of the arrow 111 to the release position and the guide pin 77 penetrates a narrow end portion 120 of the guide opening 107. By roughening the surface or providing a friction surface the guide pin 77 is retained in this narrow end portion because of the increased friction. During the movement of the slide 75 through the overtravel path 14 the upper end portion 79 of the guide pin 77 butts against the outer end 117 of the slot 81 in the push-button rod 7.

A simultaneous return of the push-button rods 7 and 8 to the initial position at the line 73, upon releasing the latching lever 51, is possible because of the intermediate slide. When the push-button rods 7 and 8 move outwards the guide pin 91 initially moves in the slot 99 and the upper end 79 of the guide pin 77 moves in the slot 81 while the intermediate slide 75 remains in the overtravel position. The latching slide is retained in its release position by means of the guide pin 77, because the guide pin 77 is retained in the narrow end portion 120 of the guide opening 107. Since the latching slide 85 is retained in the release position, the guide pins 91 and 95 can pass the latching recesses 105 and the latching cams 101 and 103. After having passed the latching cams 101 and 103 the guide pin 91 butts against the outer end 118 of the slot 99 in the intermediate slide 75. Consequently, the intermediate slide is moved by the guide pin 91 from the overtravel position and the pin 77 is withdrawn from the narrow end portion 120 of the guide opening 107. The latching slide 85 is thus released and is free to return to the latched position in the direction of the arrow 119 under the influence of the spring 113. At the end of the outward movement the buttons 3 and 5 are again disposed at the line 73 and the push-button rods 7 and 8 are in the initial position.

Figure 5:
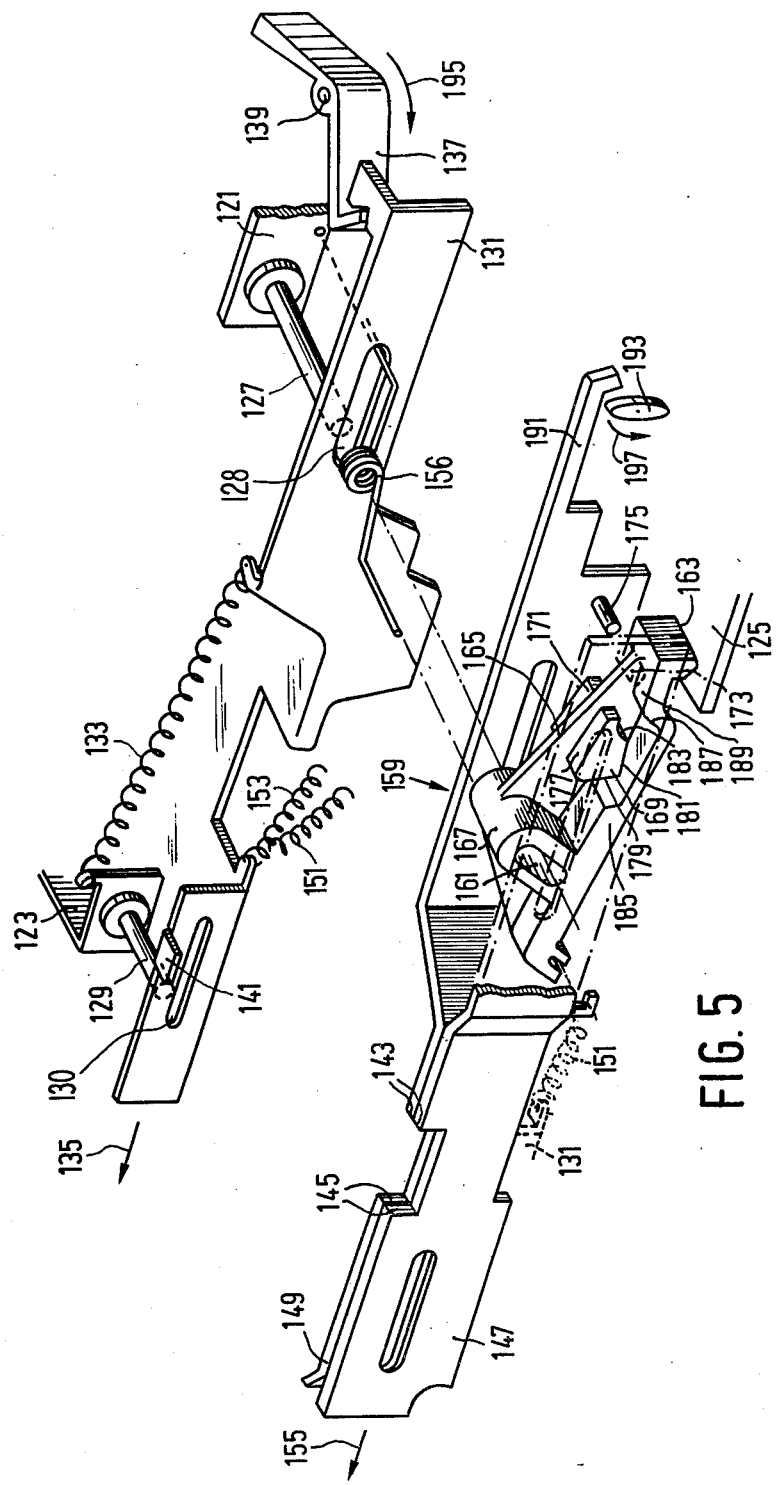
FIG. 5 is a diagrammatic perspective view of a second embodiment of an apparatus in accordance with the invention with the interlocking mechanism for two push-buttons shown in the rest position.

FIG. 5 only shows those parts of the second embodiment of an apparatus in accordance with the invention, which are relevant to the invention, in the rest position, in which a cassette has not been inserted into the apparatus and the pushbuttons are in the fully depressed condition. The apparatus comprises chassis parts 121, 123 and 125, the parts 121 and 123 each comprising a guide pin 127 and 129 respectively. The pins pass through respective slots 128 and 130 in a rectilinearly movable actuating bracket 131 to guide the bracket for actuating a head slide, not shown, which carries a magnetic head and a pressure roller, a tension spring 133 urging the bracket in the direction of the arrow 135. In the rest position of the apparatus shown in FIG. 5 the actuating bracket is latched behind an ejection bracket 137 against the force of the spring 133, the ejection bracket being pivotable about an axis 139.

Near the front of the apparatus the actuating bracket 131 comprises a tab 141, whose free end cooperates with raised edges 143 and 145 of push-button rods or brackets 147 and 149, which in a manner not shown each carry an actuating button at the apparatus front (near the left-hand end in FIG. 5). In FIG. 5 the tab 141 is positioned against the edges 143 under the influence of tension springs 151 and 153 respectively, which springs are arranged between the actuating bracket 131 and the brackets 147 and 149 respectively and urge said brackes toward the front or initial position in the direction of an arrow 155 parallel to the arrow 135. To aid comprehension, the spring 151 and a portion of bracket 131 are shown a second time in FIG. 5, as dotted lines under bracket 147. Turns of a two-armed spring 156 are arranged around the guide pin 127, one arm of this spring being passed through an opening in the chassis part 121 and the end 157 of the other arm extending into a slot at the front end of a catch 159 to urge the front end upward. The catch 159 is situated in the back of the apparatus in a space between the push-button brackets 147 and 149, and has a nearly vertical slot 161, through which an end portion of the pin 127 passes. The catch 159 comprises a tab 163 at its rear, or right hand end in FIG. 5, which tab presses against the chassis part 125 under the influence of the spring 156 which tends to pivot the catch about the pin 127. In the rest position of the apparatus the pin 127 is pressed against the lower part of the slot 161.

The catch 159, which is suitably injection-molded from a plastic such as a polyacetal, has a central wall 165, which extends between the tab 163 and a raised portion 167 in which the slot 161 if formed. The wall is parallel to the adjacent portions of the brackets 147 and 149. On both sides of the central wall of the catch 159 cams 169 and 171 are arranged mirror-symmetrically. The cams are adapted to cooperate with follower pins 173 (shown by dotted lines) and 175, which are arranged on facing sides of the brackets 147 and 149 in such a way that the longitudinal axes of the pins coincide when these brackets are in the rest or an equally depressed condition. The cams each comprise a circumferential contour for the associated pin. Thus, viewed in the position shown in FIG. 5, the cam 169 comprises an upper wall 177 which viewed from the left-hand side is flat and slopes downwards toward the rear, a flat sloping-down front wall 179, a flat lower wall 181, and a substantially cylindrical lower rear wall 183, which bounds a cavity to be described below. The catch 159 has a base portion 185 extending to each side from the wall 165 underneath the cams 169 and 171, which base portion together with the adjoining guide surfaces formed by the walls 179, 181 and 183 bounds a passage for the pin 173, and at the rear has an upright stop contour 187. The surfaces 177, 179, 171, 183 and 187 together constitute the guide contours for the follower pins. In the rest position shown in FIG. 5, the pins 173 and 175 are disposed above upwardly inclined ramp surfaces 189 of the base portion 185.

The push-button bracket 149 also has a rearwardly projecting hook 191, which is adapted to cooperate with an electrical switch; as shown in FIG. 5 a pivotable switching cam 193 is clear of the hook 191 in the rest position of the apparatus.

Figure 6:
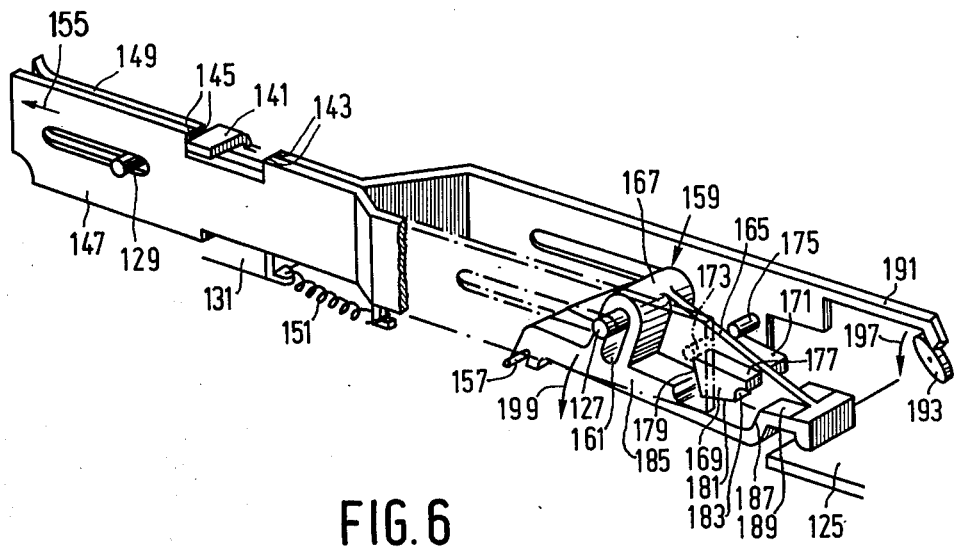
FIGS. 6 to 8 are perspective views of the interlocking mechanism of the two push-buttons shown in FIG. 5 in the functional positions for cassette insertion, play mode and fast forward mode respectively.
Figure 9:
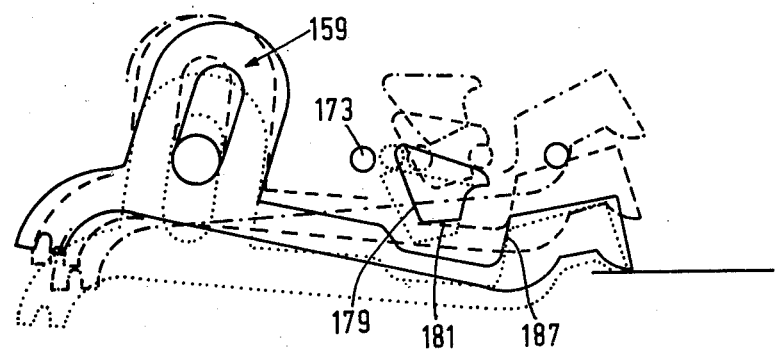
FIG. 9 is a partial elevation view showing the movements and various positions of the interlocking mechanism, specifically in the case of simultaneous depression of the two push-buttons.

When a magnetic tape cassette is inserted into the apparatus the cassette pivots the ejection bracket 137 about the pivotal axis 139 in the direction of arrow 195 in FIG. 5, so that the actuating bracket 131 is unlatched and moves forward to (the left in the direction of the arrow 135 shown). Thus, the tab 141 on the bracket 131 is also moved to the left, as a result of which the tab 141 strikes against the wall 145, thereby causing the two brackets 147 and 149 to be moved to the left in accordance with the arrow 155 over the same distance and at the same time so that the corresponding push-buttons move forward or outward. During this movement the hook 191 pivots the switching cam 193 in accordance with an arrow 197, and the two pins 173 and 175 slide over the upper wall surfaces 177 of the cams 169 and 171 respectively. During this sliding movement the pins press against the cams, causing the catch 159, as is shown in FIG. 6, to pivot downward in the direction of an arrow 199 about the end of the tab 163 which bears down on the chassis part 125. In FIG. 9 the fully swung-down position of the catch 159 is clearly indicated by a dotted line. The spring 157 is then tensioned and the end portion of the pin 127 will be disposed at the other or upper end of the slot 161. As soon as the pins 173 and 175 have passed the upper surfaces 177, the spring 157 urges the catch 159 back into the initial position of FIG. 5, which also corresponds to the position of FIG. 7.

Figure 7:
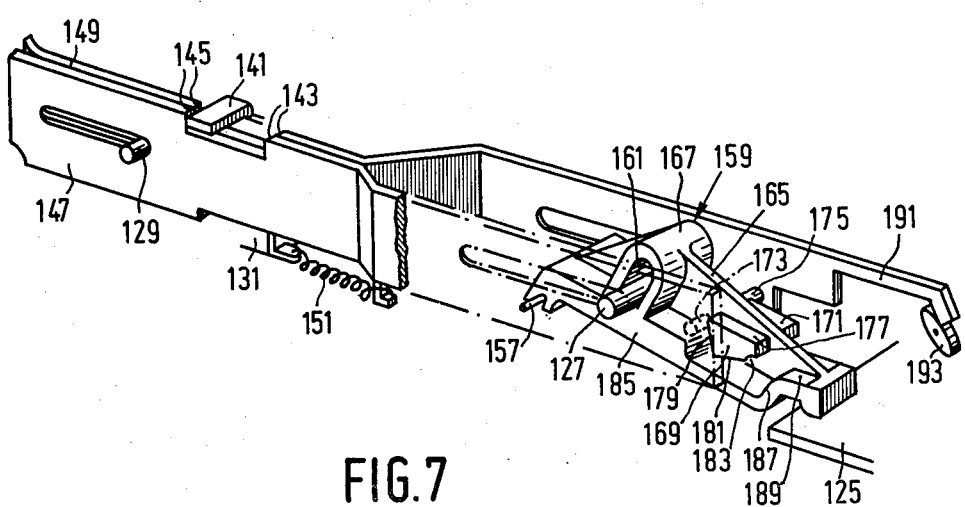

In the play mode of the apparatus, shown in FIG. 7, the pins 173 and 175 are situated at a certain distance to the left of the front walls 179, while the switching cam 193 occupies an end position in which a drive motor, not shown, for driving the apparatus receives a supply voltage suitable for the play mode.

During the movement of the brackets 147 and 149 to the play position the actuating bracket 131 has shifted the head slide, not shown, and has coupled the drive system of the apparatus to the winding hubs of the cassette.

Figure 8:
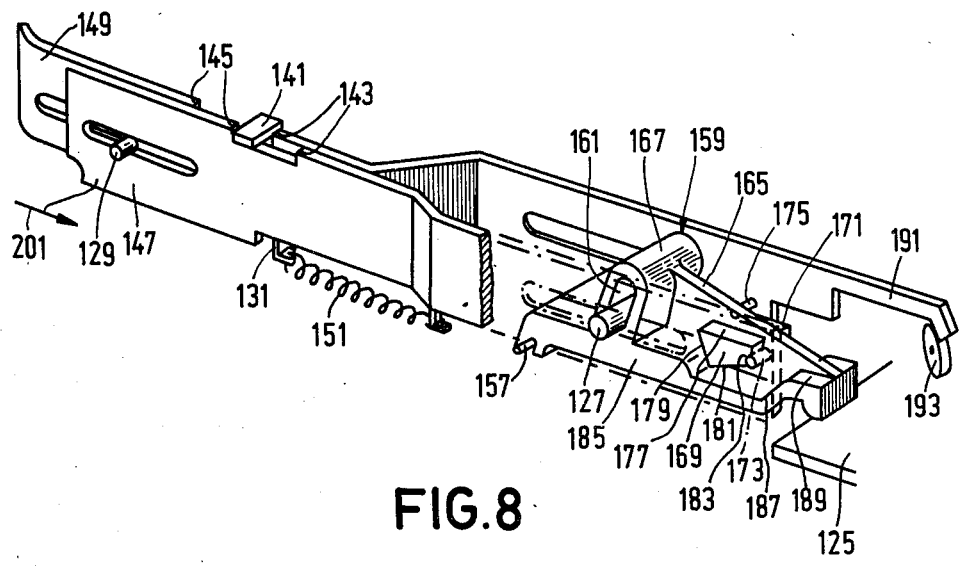

If, as is shown in FIG. 8, the bracket 147 is pushed in the direction of an arrow 201 when the apparatus is in the play mode, the tab 141 also is moved along the same distance. Thus, after some movement of the bracket 147, the tab 141 presses against the edge 143 of the bracket 149, so that bracket 149 is moved over a distance which is short compared with the total movement of the bracket 147. The movement of the bracket 147 results in the pin 173 sliding along the sloping front wall 179 and causing the catch 159 to pivot about the guide pin 127 until the tab 163 occupies a fully swung-up position which is represented by a dash-dot line in FIG. 9. Subsequently, the pin 173 slides along and past the lower wall 181, and at the same time the pin 175 moves up to the other front wall 179 owing to the small displacement of the bracket 149 and presses against that other front wall. Thus, the catch cannot swing back after the pin 173 has passed the lower wall 181. As a result of this, the pin 173 butts against the stop contour 187, so that the bracket 147 cannot move any further. The bracket 147 is then slightly pulled back by the spring 151, so that the pin 173 enters the cavity bounded by the lower rear wall 183 and thereby latches the bracket 147. In this way the lower rear wall 183 defines a latched position of the catch. In the pivotal position of the catch represented by dashed lines in FIG. 9, the tab 163 is clear of the chassis part 125. As a result of the movement of the bracket 149 the switching cam 193 has swung back to an intermediate position, so that the drive motor receives a higher voltage and its speed in this fast forward mode is higher than in the play mode of FIG. 7.

As a result of the movement of the tab 141 the head slide is slightly shifted, thereby withdrawing the pressure roller from the magnetic tape, so that fast forward operation is not impeded. The displacement of the tab 141 is so small that the actuating bracket 131 does not influence the position of the ejection bracket 137.

If subsequently the bracket 149 is pushed inwards, the pin 175 pivots the catch 159 upwards into the fully swung-up position shown in FIG. 9, which results in the pin 173 and hence the bracket 147 being unlatched. The bracket 147 is returned forward by the spring 151, so that the pin 173 is now positioned opposite the front wall, while the pin 175 performs a movement corresponding to the movement of the pin 173 upon actuation of the bracket 147. Further movement of the bracket 149 results in the switching cam 193 being swung back slightly further, but also in this position the higher voltage is still applied to the drive motor. In a manner not shown the direction of rotation of the drive system of the apparatus is reversed, so that now fast reverse operation is possible.

When the two brackets 147 and 149 are pushed in simultaneously the catch 159 performs a number of movements represented in FIG. 9. It is assumed that the apparatus is initially in the play mode shown in FIG. 7. It is also possible to actuate both brackets when the apparatus is in the fast-forward or fast-reverse mode. Now, the two pins 173 and 175 sliding along the walls 179 and 181 of the cams 169 and 171, the catch 159 is pivoted into the fully swung-up position, represented by a dash-dot line in FIG. 9, but immediately after the two pins pass the lower wall 181 the spring 157 causes the catch to pivot back about the pin 127. A dashed line in FIG. 9 represents an intermediate position of the catch 159 and the pin 173, corresponding to the latched pivotal position during fast-forward operation. The difference is now that a further movement of the pins 173 and 175 to the right is not impeded by the stop contour 187, so that the catch can return to the initial position and the pins 173 and 175 move to the extreme right position in FIG. 9. While the head slide is lifted and the cassette drive is disengaged, the brackets 147 and 149 move the tab 141 and thus the actuating bracket 131, in a manner not shown, into an overtravel position in which the ejection bracket 137 is swung back, the cassette is ejected and the bracket 131 is latched again as in FIG. 5. The switching cam 193 has pivoted back into the position of FIG. 5, in which the motor is switched off.

When upon completion of the last movement the brackets have moved a short distance to the left under the influence of the springs 151 and 153, the tab 141 again being positioned against the edges 143, the rest position of the apparatus shown in FIG. 5 is restored.

What is claimed is:

1. An interlocked control mechanism for controlling a plurality of apparatus functions, comprising at least two rods mounted for individual movement from an initial position over a given travel in an actuating direction, for controlling respective individual apparatus functions in response to individual movement of a rod; and means for individually latching a rod, which has been moved said given travel, in a position in which a respective apparatus function is performed, characterized in that the mechanism further comprises means for limiting travel of a rod to a normal travel when only that one rod is moved through said normal travel, said means for limiting including a movable element moved from an initial position to a normal-travel-limiting position in response to normal travel of said one member, in said normal-travel-limiting position said element limiting further movement of said one member, means, responsive to movement of said at least two rods along said normal travel, for permitting movement of said element beyond said normal-travel-limiting position so as to permit said at least two rods to be movable together along an overtravel path greater than said normal travel, and means for performing an apparatus function in response to movement of said rods along said overtravel.

2. A mechanism as claimed in claim 1, characterized in that said means for limiting includes at least one guide contour, and said movable element is a follower pin arranged to engage said contour during a portion of the movement of said one rod along the normal travel.

3. A mechanism as claimed in claim 2, characterized in that said follower pin and said contour each have a substantially linear movement during said normal travel and said overtravel.

4. A mechanism as claimed in claim 3, characterized in that said at least two rods each have a respective guide contour member having a same configuration, said guide contours being aligned when said rods are in said initial position; and a single follower pin engages one portion of the contour of said one rod during normal travel of said rod, and also engages a stop portion of the contour of another rod at the end of the normal travel.

5. A magnetic-tape cassette apparatus comprising at least two pushbuttons arranged to be individually depressible from an initial position over a given normal travel for controlling respective individual functions of the apparatus, two pushbutton rods respectively connected to the pushbuttons and arranged to be movable from an initial position over said given travel in an actuating direction; a cassette holder for receiving a cassette; means for ejecting a cassette from the holder in response to simultaneous depression of said buttons; and means for individually latching a rod, which has been moved said given travel, in a position in which a respective apparatus function is performed, characterized in that the apparatus further comprises means for limiting travel of one rod to a normal travel when only that one rod is moved through said normal travel, said means for limiting including a movable element moved from an initial position to a normal-travel-limiting position in response to normal travel of said one member, in said normal-travel-limiting position said element limiting further movement of said one member, means, responsive to movement of said at least two rods along said normal travel, for permitting movement of said element beyond said normal-travel-limiting position so as to permit said at least two rods to be movable together along an overtravel path greater than said normal travel, and further characterized in that said means for ejecting operates in response to movement of said rods along said overtravel.

6. An apparatus as claimed in claim 5, characterized in that said means for limiting includes at least one guide contour, and said movable element is a follower pin arranged to engage said contour during a portion of the movement of said one rod along the normal travel, the movement of said follower pin controlling an individual function of the apparatus.

7. An apparatus as claimed in claim 6, characterized in that said follower pin and said contour each has a substantially linear movement during said normal travel and said overtravel.

8. An apparatus as claimed in claim 7, characterized in that said means for limiting comprises two said guide contours, each formed as a part of a respective push-button rod, said guide contours being coincident when the push-button rods are in an initial position, and said follower pin is an actuating roller arranged to move transversely of said direction of rod travel, normal travel being defined by engagement of the roller between an oblique surface of one contour and a stop surface on the other guide contour.

9. An apparatus as claimed in claim 5, characterized in that the apparatus comprises a pivotal catch, and said means for moving comprise at least one follower pin and guide contours, during simultaneous displacement of the push-button rods, the catch is pivoted by cooperation between said at least one follower pin and at least one of the guide contours to a position in which the push-button rods can move through a common overtravel path.

10. An apparatus as claimed in claim 9, characterized in that said guide contours are coincident guide contours formed on respective push-button rods, the catch scans the guide contours by means of said at least one follower pin, the guide contours each have a receding portion having adjoining portions disposed in line to each side of the receding portion, so arranged that during individual actuation of a push-button rod the receding portion is aligned opposite one of said adjacent in-line portions on the other rod, and upon simultaneous actuation of the push-button rods, one of the follower pins moves into the receding portions, so that the catch is pivoted to provide a longer common overtravel path for the two push-button rods.

11. An apparatus as claimed in claim 10, characterized in that the said movable element is an actuating roller movable linearly to control an apparatus function, and said guide contours include stop edges, so arranged that upon individual depression over normal travel the roller abuts the stop edge of the non-depressed rod.

12. An apparatus as claimed in claim 11, characterized in that one of the push-button rods includes a ramp surface, and that the apparatus further comprises a slide pin arranged to engage said ramp surface during passage through the overtravel path, to raise and lower the cassette holder.

13. An apparatus as claimed in claim 9, characterized in that one of the push-button rods includes a ramp surface, and that the apparatus further comprises a slide pin arranged to engage said ramp surface during passage through the overtravel path, to raise and lower the cassette holder.

14. An apparatus as claimed in claim 5, characterized in that one of the push-button rods includes a ramp surface, and that the apparatus further comprises a slide pin arranged to engage said ramp surface during passage through the overtravel path, to raise and lower the cassette holder.

15. An interlocked control mechanism for controlling a plurality of apparatus functions, comprising at least two rods mounted for individual movement from an initial position over a given travel in an actuating direction, for controlling respective individual apparatus functions in response to individual movement of a rod; and means for individually latching a rod, which has been moved said given travel, in a position in which a respective apparatus function is performed, characterized in that the mechanism further comprises means, including at least one guide contour and a follower pin arranged to engage said contour during a portion of the movement of one rod along a normal travel, for limiting travel of said one rod to a normal travel when only that one rod is moved through said normal travel, said follower pin having a substantially linear movement and said contour having a pivotal movement about a first axis during a first portion of said normal travel and a pivotal movement about a second axis spaced from said first axis during a second portion of said normal travel, means, response to movement of said at least two rods along said normal travel, for pivoting said contour to a position in which at least two rods are movable together along an overtravel path greater than said normal travel, and means for performing an apparatus function in response to movement of said rods along said overtravel.

16. A mechanism as claimed in claim 15, characterized in that a respective individual follower pin is fixed with respect to each of said at least two rods, and said contour is formed on a catch which is spring biassed in a pivoting direction, one of said pins engaging one portion of the contour during normal travel to pivot the contour about a first axis against said spring bias, and said means for individually latching a rod comprises another portion of said contour arranged to engage said one pin.

17. A magnetic-tape cassette apparatus comprising at least two pushbuttons arranged to be individually depressible from an initial position over a given normal travel for controlling respective individual functions of the apparatus, two pushbutton rods respectively connected to the pushbuttons and arranged to be movable from an initial position over said given travel in an actuating direction; a cassette holder for receiving a cassette; means for ejecting a cassette from the holder in response to simultaneous depression of said buttons; means for individually latching a rod, which has been moved said given travel, in a position in which a respective apparatus function is performed, characterized in that the apparatus further comprises means, including a pivotable catch having at least one guide contour, and a follower pin arranged to engage said contour during a portion of the movement of one rod along a normal travel, for limiting travel of said one rod to a normal travel when only that one rod is moved through said normal travel, said follower pin having a substantially linear movement and said catch having a pivotal movement about a first axis during a first portion of said normal travel and a pivotal movement about a second axis spaced from said first axis during a second portion of said normal travel, means, response to movement of said at least two rods along said normal travel, for pivoting said catch to a position in which at least two rods are movable together along an overtravel path greater than said normal travel, and means for performing an apparatus function in response to movement of said rods along said overtravel.

18. An apparatus as claimed in claim 17, characterized in that each of said rods has a respective follower pin arranged thereon, and in that the catch has coincident identical guide contours arranged to be engaged and pivoted by respective ones of said follower pins.

19. An apparatus as claimed in claim 18, characterized in that the catch includes a central catch wall, said coincident guide contours being spaced from each other one to each side of said central wall, said follower pins extending in opposite directions toward each other to engage associated guide contours.

20. An apparatus as claimed in claim 19, characterized in that the guide contours each comprise a circumferential contour having a latching position, and a separate stop contour against which the respective follower pin of an individually actuated push-button rod abuts before being engaged in the latching position of the circumferential contour, upon simultaneous actuation of said push-button rods the two follower pins passing between the stop contour and the circumferential contour in order to move along the overtravel path.

21. An apparatus as claimed in claim 20, characterized in that the circumferential contour includes an inclined surface arranged to be engaged by a follower pin on a non-depressed rod which is depressed while another rod is in the latched position, such that continued depression of the non-depressed rod pivots the catch in a direction so as to unlatch the latched follower pin and rod.

* * * * *